(12) United States Patent
Yu et al.

(10) Patent No.: US 7,525,802 B2
(45) Date of Patent: Apr. 28, 2009

(54) COMPUTER WITH HEAT DISSIPATION SYSTEM

(75) Inventors: Hui Yu, Shenzhen (CN); Mu-Chang Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/838,904

(22) Filed: Aug. 15, 2007

(65) Prior Publication Data
US 2009/0009966 A1    Jan. 8, 2009

(30) Foreign Application Priority Data
Jul. 2, 2007    (CN)    .................. 2007 1 0200980

(51) Int. Cl.
*H05K 7/20* (2006.01)
*F28F 7/00* (2006.01)

(52) U.S. Cl. .................. 361/701; 165/80.3; 165/104.33; 361/695; 361/700

(58) Field of Classification Search .................. 361/695
See application file for complete search history.

(56) References Cited

U.S. PATENT DOCUMENTS

| | | | | |
|---|---|---|---|---|
| 5,689,403 | A * | 11/1997 | Robertson et al. | 361/695 |
| 5,694,294 | A * | 12/1997 | Ohashi et al. | 361/687 |
| 5,907,473 | A * | 5/1999 | Przilas et al. | 361/699 |
| 5,934,079 | A * | 8/1999 | Han et al. | 62/3.2 |
| 6,359,779 | B1 * | 3/2002 | Frank et al. | 361/687 |
| 6,430,042 | B1 * | 8/2002 | Ohashi et al. | 361/687 |
| 7,289,320 | B2 * | 10/2007 | Chang et al. | 361/690 |

* cited by examiner

*Primary Examiner*—Gregory D Thompson
(74) *Attorney, Agent, or Firm*—Frank R. Niranjan

(57) ABSTRACT

A computer includes a motherboard (2), an enclosure (1), and a fan (153). The motherboard has a first heat generating device (21) mounted thereon. The enclosure has a substantially sealed first compartment (10), and an airflow chamber (30) in communication with an exterior of the enclosure. The first compartment receives the first heat generating device therein. The first compartment has a first heat exchanger (3) for conducting heat from an interior of the first compartment to the airflow chamber. The fan is arranged in the airflow chamber.

10 Claims, 7 Drawing Sheets

COMPUTER WITH HEAT DISSIPATION SYSTEM

BACKGROUND

1. Field of the Invention

The present invention relates to a computer with heat dissipation system, and more particularly to a computer with dust proof heat dissipation system.

2. Description of Related Art

Computer systems have attained widespread use in many segments of today's modern society. Computer systems are typically provided with enclosures, which protect the operating components therein.

Many components of computers generate heat during operation, making it necessary to cool those components so that proper functioning continues, particularly because of the confined space of the enclosure which makes natural heat dissipation difficult. Cooling strategies for computers usually rely upon forced airflow through the computer enclosure. A typical arrangement provides a single fan, typically mounted in or adjacent to the power supply for the computer, which induces a flow of air through the enclosure and particularly through the power supply, which is often the principal heat source within the enclosure. While the forced air provides an effective method for cooling computers, it also brings dust or other particles into the enclosure. Dust may then gather on critical components, eventually resulting in failure of that component and potentially the entire computer. The problem of accumulated dust is exacerbated for thermally-sensitive components, as dust accumulations contribute to overheating and eventual failure. Accumulation of dust may result in a safety hazard as well. Dust on a heat generating component typically heats up with that component, which may result in a fire. A fire may also be created when accumulated dust creates a short between two electrical components.

One method of remedying the dust problem is to periodically open up the system to either blow out the dust using compressed air or to collect the dust with a vacuum cleaner. Manually blowing out or removing the dust with a vacuum cleaner is time-consuming for the user. Moreover, these methods rely on users willingness to do the work themselves, and therefore may not be done thus allowing the accumulation of dust. These methods also require for the computer to be turned off in order to open the system up, resulting in downtime for the system. Because of their cost, complication, and ineffectiveness, these methods do not provide a satisfactory solution for many users.

Some systems implement a filter at the air inlet of the enclosure, attempting to reduce the amount of dust that enters the system. Filtration systems do remove some of the dust that would otherwise enter the system. Filtration systems, however, are somewhat inefficient, particularly for small particles, resulting in significant amounts of dust still entering. Another problem with filtration systems is that they can drastically reduce the amount of air entering the system, making cooling more difficult. More effective filters with smaller gaps decrease the amount of air that goes through at a given power setting, causing either reduced airflow or requiring increased fan size or power. Neither solution is desirable as they increase costs and run the risk of creating more noise.

What is needed, therefore, is an effective and efficient system for dust proofing electronic components in a computer.

SUMMARY

A computer includes a motherboard, an enclosure, and a fan. The motherboard has a first heat generating device mounted thereon. The enclosure has a substantially sealed first compartment, and an airflow chamber in communication with an exterior of the enclosure. The first compartment receives the first heat generating device therein. The first compartment has a first heat exchanger for conducting heat from an interior of the first compartment to the airflow chamber. The fan is arranged in the airflow chamber.

Other advantages and novel features of the present invention will become more apparent from the following detailed description of a preferred embodiment when taken in conjunction with the accompanying drawings, in which:

DETAILED DESCRIPTION

Figure 1:
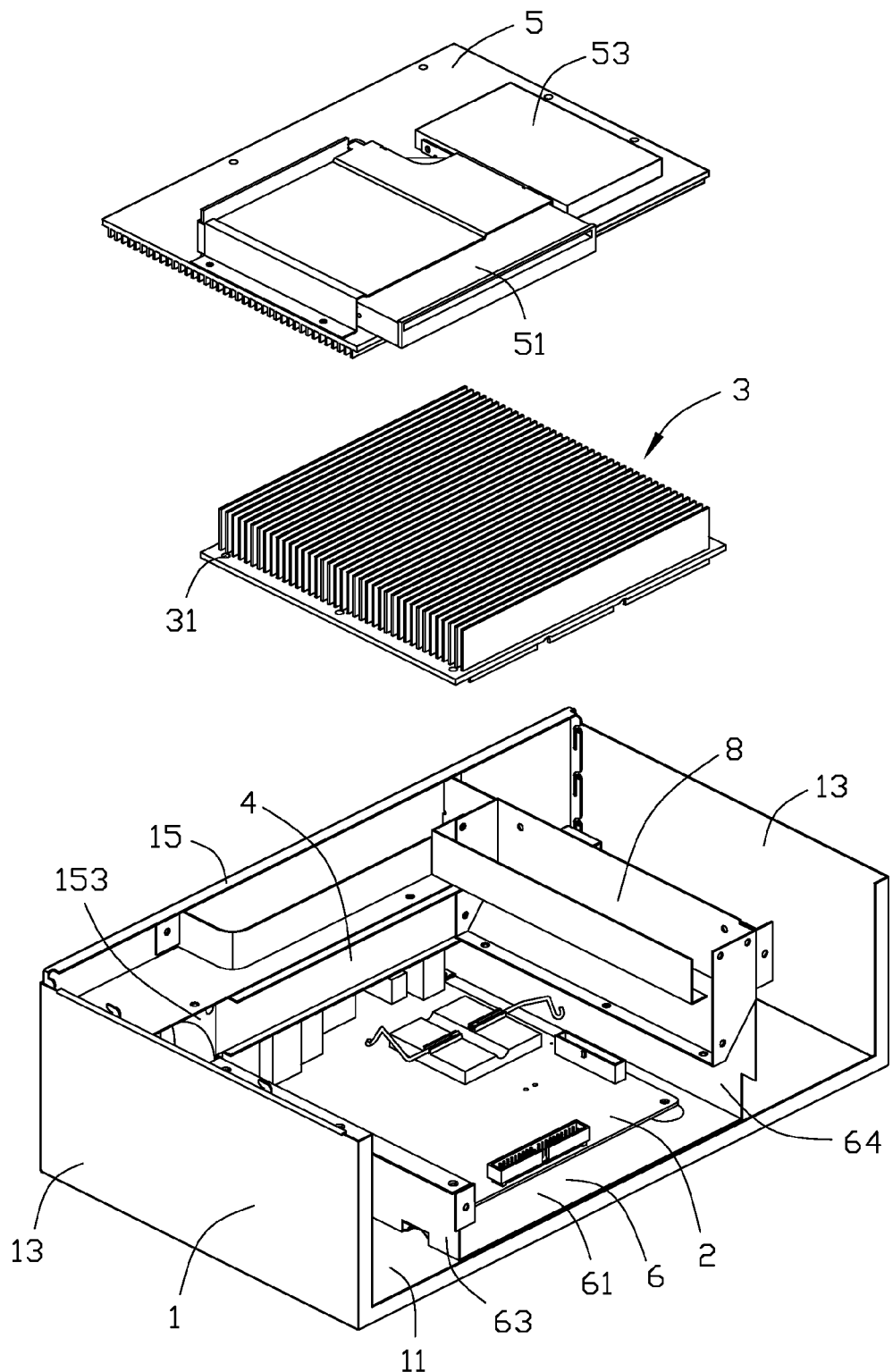
FIG. 1 is an exploded, isometric view of a computer with heat dissipation system according to a preferred embodiment of the present invention, the computer including an enclosure, a motherboard, and a fan.
Figure 2:
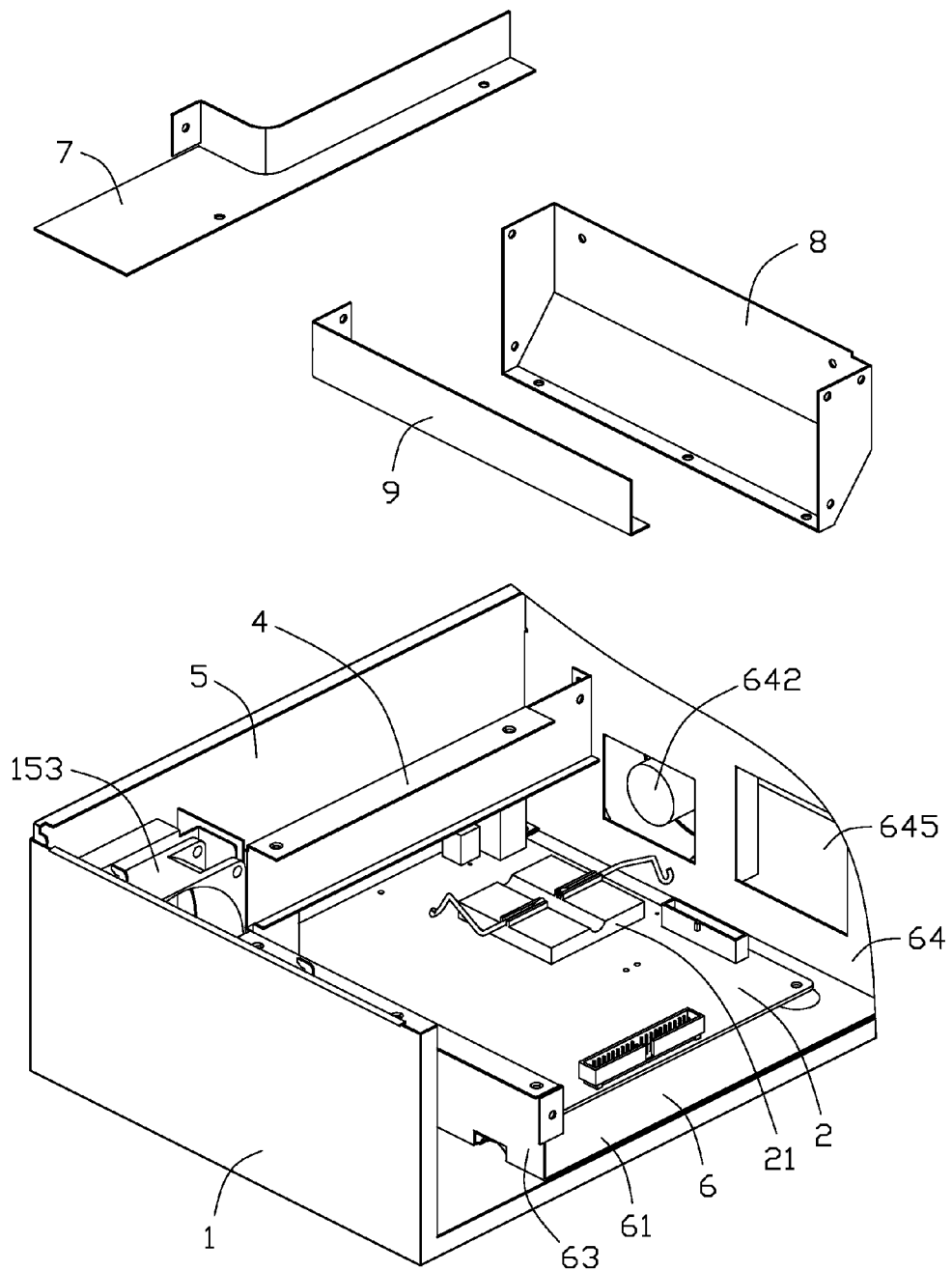
FIG. 2 is a partial, enlarged, exploded, isometric view of the computer of FIG. 1.

Referring to FIG. 1 and FIG. 2, a computer has an enclosure 1. The enclosure 1 has a bottom panel 11, a pair of side panels 13, a front panel 15, a back panel 17 (shown in FIG. 5), and a top cover 19 (shown in FIG. 5). The top cover 19 has an opening serving as an air intake vent 193. A cage 6 is positioned in the enclosure 1. The cage 6 includes a bottom wall 61, a first side wall 63 and a second side wall 64. A mounting bracket 8 is attached to the second side wall 64 corresponding to the intake vent 193 of the top cover 19. A fan 642 is mounted in the second side wall 64 under the mounting bracket 8. An output opening 645 is defined in the second side wall 64 adjacent the fan 642. A first frame 9 is attached to the mounting bracket 8. A beam 4 is secured to the front panel 5 and the side wall 64. A second frame 7 is mounted on top of the beam 4. A motherboard 2 is positioned in the cage 6. A heat generating element 21 such as a CPU (central process unit) is attached thereon.

Figure 3:
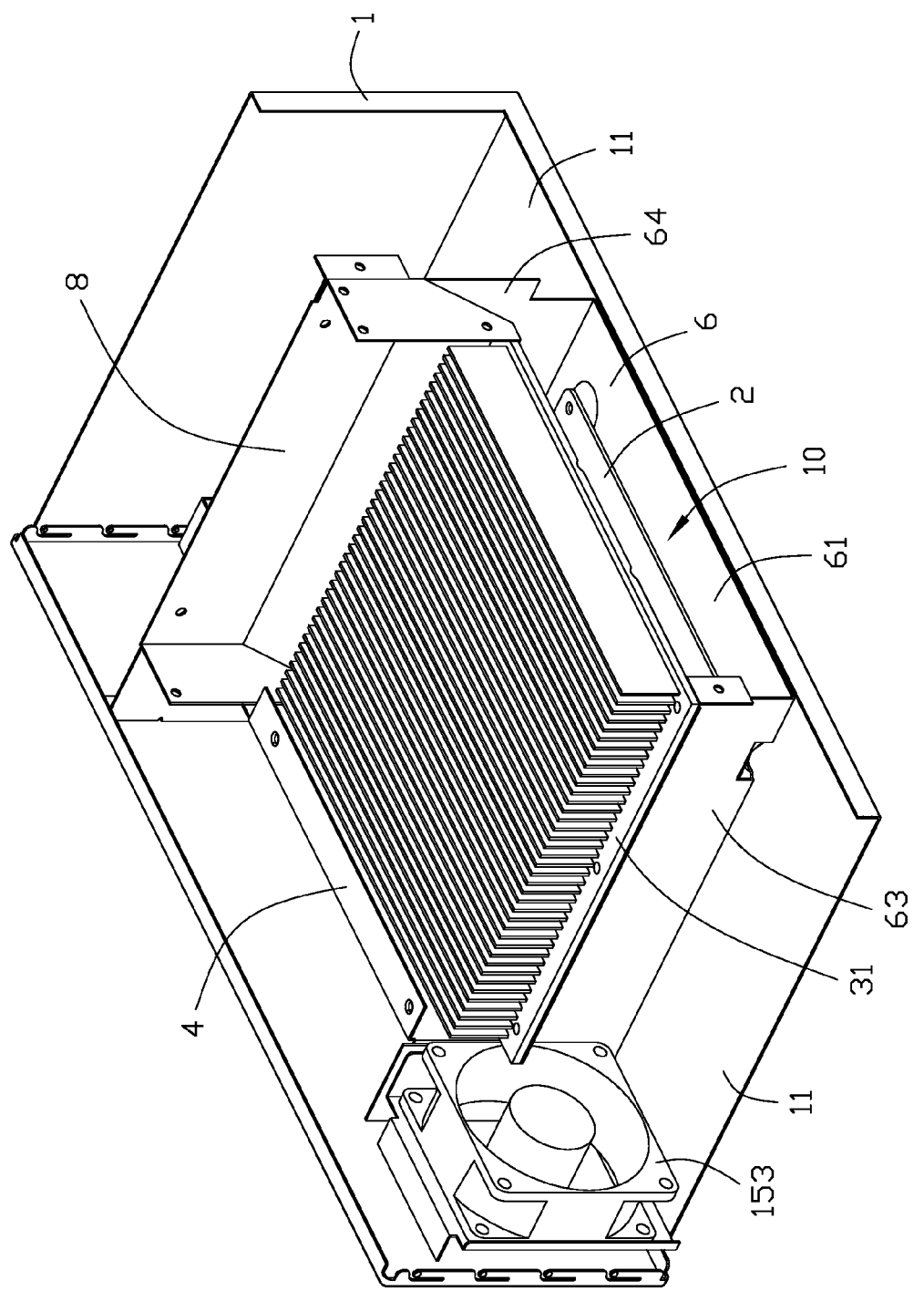
FIG. 3 is a partial, assembled view of FIG. 1.
Figure 6:
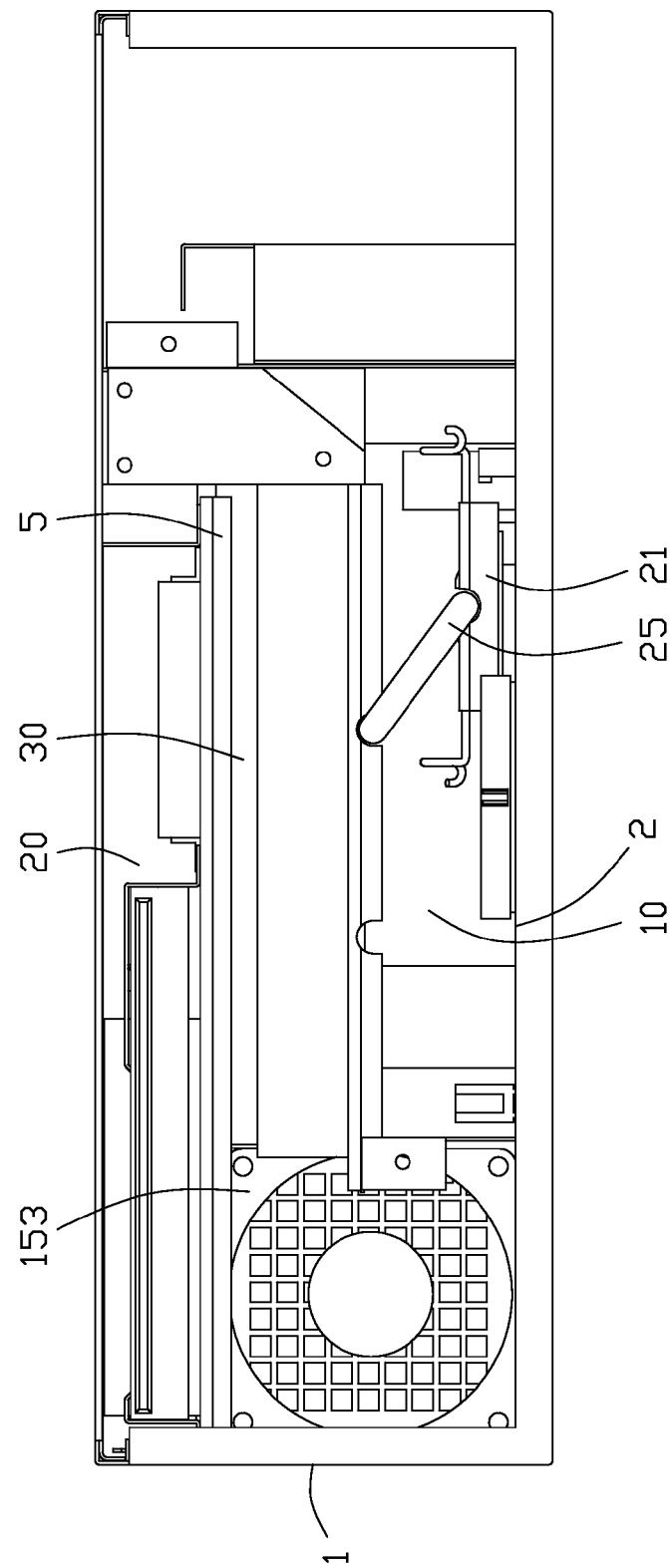
FIG. 6 is a side sectional view of FIG. 5.

Referring also to FIG. 3, a first heat exchanger 3 has a base board 31, and a plurality of fins is formed on opposite sides of the base board 31. A first compartment 10 is enclosed by the first side wall 63, the side panel 13, the front panel 15 and the back panel, and the first heat exchanger 3. The first compartment 10 is substantially sealed. And is divided into two sections by the second side wall 64. A heat pipe 25 (see FIG. 6) is connected to the heat generating element 21 and the first heat exchanger 3 so that heat can be conducted from the heat generating element 21 to the first heat exchanger 3 directly. The fan 642 is used for circulating the air inside the first compartment 10 for facilitating heat dissipation.

Figure 4:
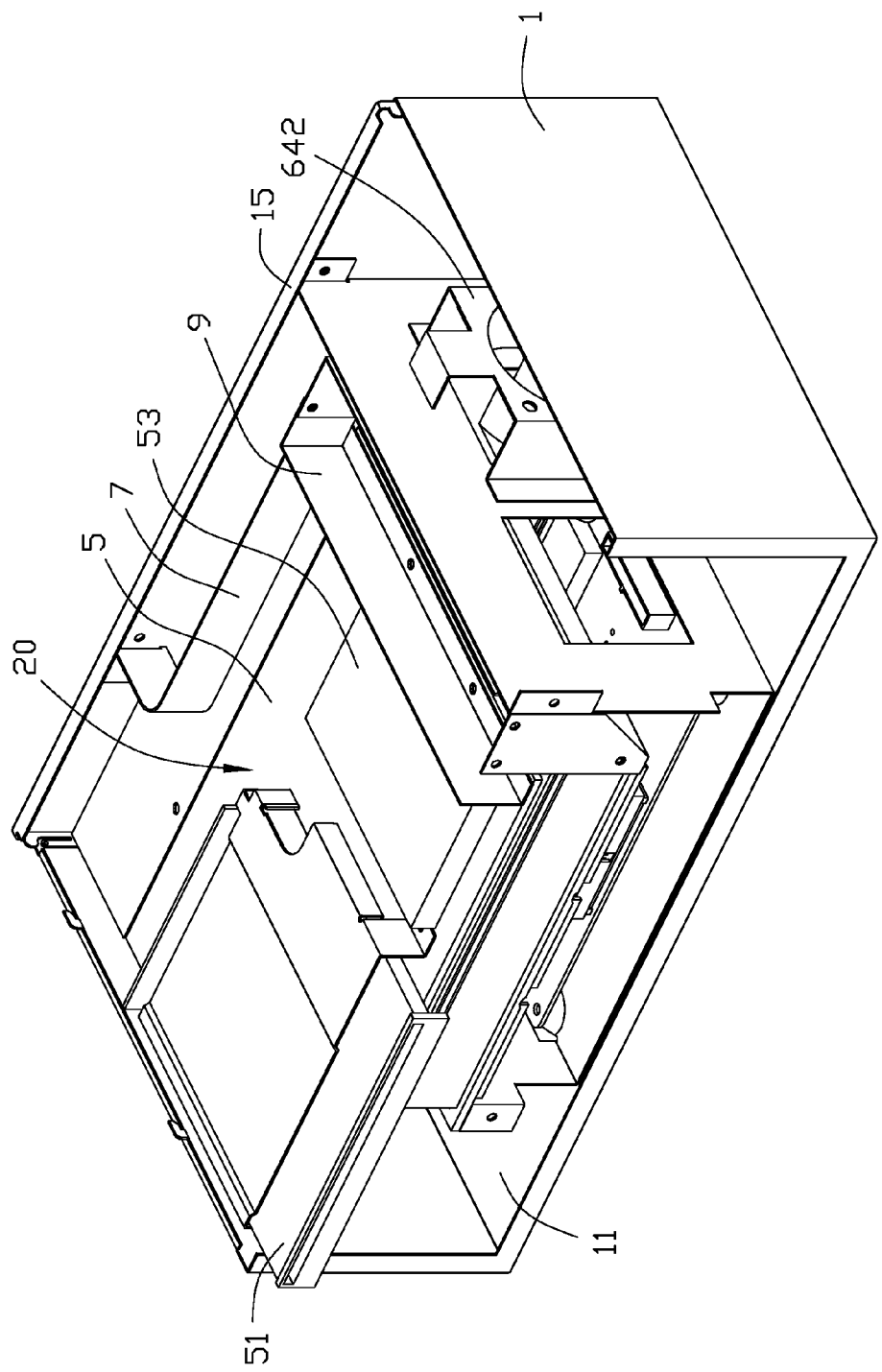
FIG. 4 is an assembled view of FIG. 1.
Figure 5:
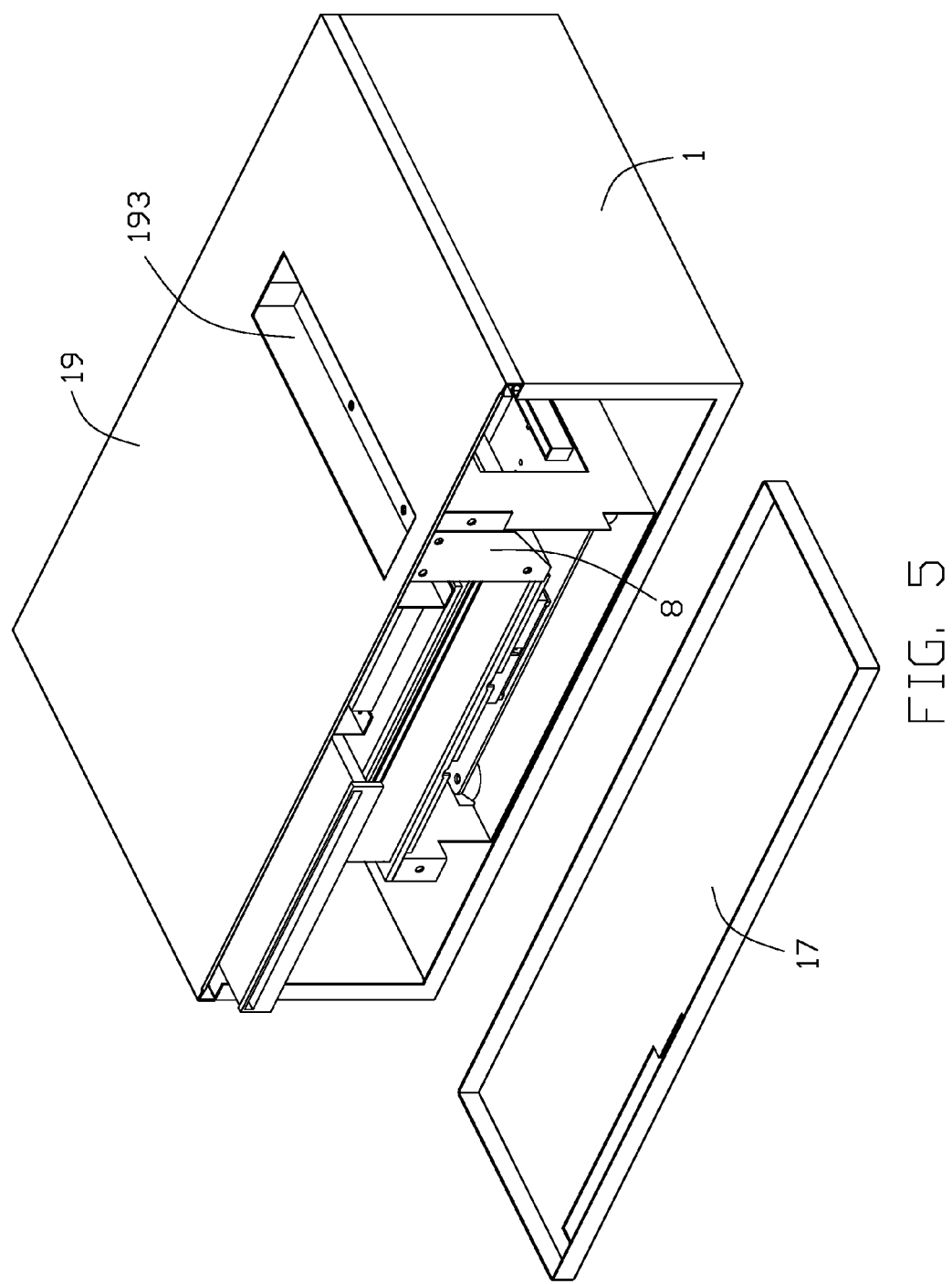
FIG. 5 is a partial assembled view of the computer according to a preferred embodiment of the present invention.

Referring also to FIG. 4 and FIG. 5, other kinds of heat generating elements such as a hard disk drive 51 and an optical disk drive 53 are mounted to a top surface of a second heat exchanger 5. The second heat exchanger 5 is mounted on top of the cage 6 for cooperatively forming a second compartment 20 with the first frame 9, the second frame 7, the side panel 13, the back panel, and the cover of the enclosure 1. The second compartment 20 is also airtight.

Figure 7:
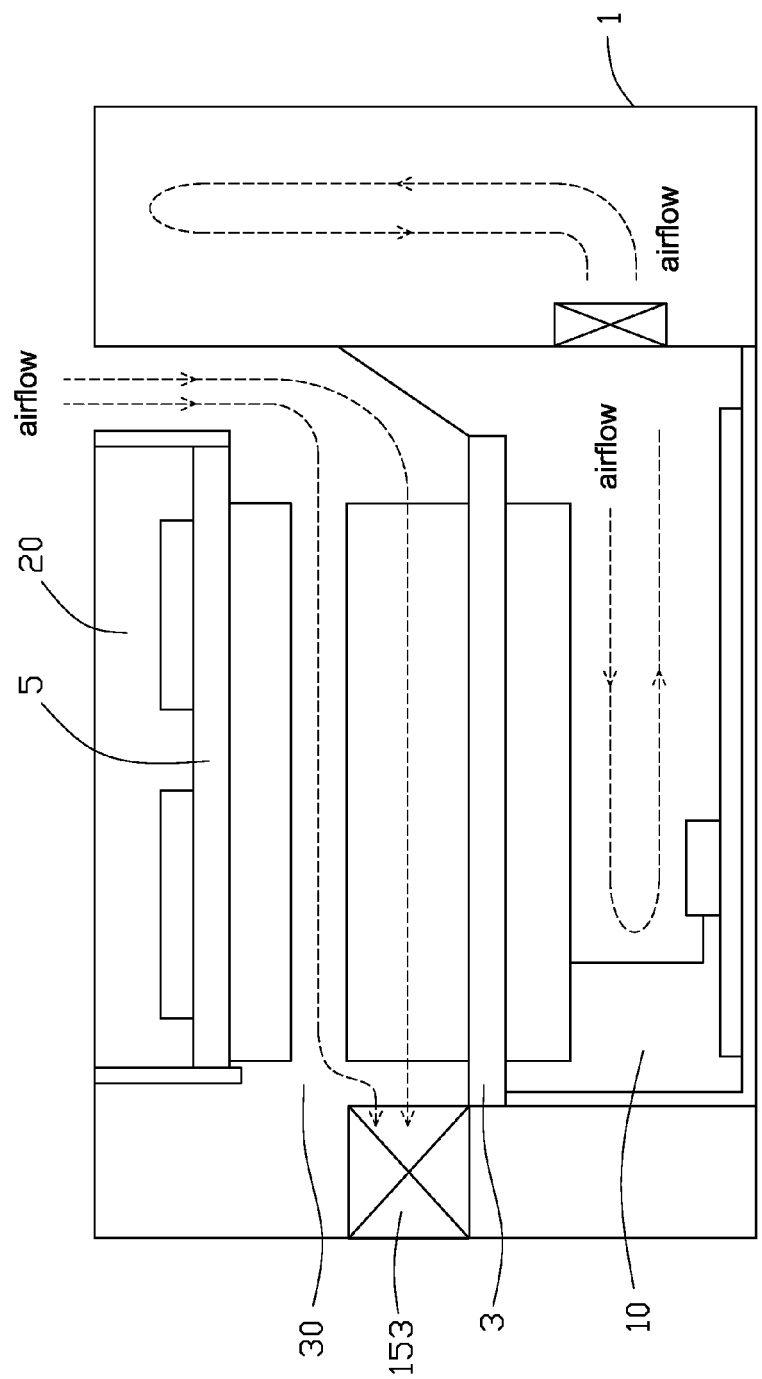
FIG. 7 is a schematic, sectional view of FIG. 6.

Referring also to FIG. 7, a heat dissipation chamber 30 is formed between the first compartment 10 and the second compartment 20. A fan 153 serving as an air output vent is secured to the enclosure 1 for drawing heated air from the dissipation chamber 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer comprising:
    a motherboard with a first heat generating device mounted thereon;
    an enclosure having a substantially sealed first compartment, and an airflow chamber in communication with an exterior of the enclosure, the first compartment receiving the first heat generating device therein, the first compartment having a first heat exchanger for conducting heat from an interior of the first compartment to the airflow chamber;
    a fan arranged in the airflow chamber; and
    at least one heat pipe having a first end thermally coupled to the first heat generating device and an opposite second end thermally coupled to the first heat exchanger.

2. The computer as described in claim 1, wherein the enclosure further comprises a sealed second compartment, a second heat generating device arranged therein, and the second compartment has a second heat exchanger for conducting heat from an interior of the second compartment to the airflow chamber.

3. The computer as described in claim 2, wherein the airflow chamber is arranged between the first and second compartment.

4. The computer as described in claim 1, wherein the first exchanger comprises a plurality of fins extending in the first compartment.

5. The computer as described in claim 1, further comprising a second fan arranged in the first compartment, wherein the first compartment has a mounting plate with the motherboard mounted thereon, and a wall extending from the mounting plate with the second fan mounted thereon.

6. A computer comprising:
    a motherboard with a first heat generating device mounted thereon;
    a second heat generating device;
    an enclosure having a substantially sealed first compartment, a substantially sealed second compartment and an airflow chamber in communication with an exterior of the enclosure, the first compartment receiving the first heat generating device therein, the first compartment having a first heat exchanger for conducting heat from an interior of the first compartment to the airflow chamber, the second compartment receiving the second heat generating device therein, the second compartment having a second heat exchanger for conducting heat from an interior of the second compartment to the airflow chamber;
    a first fan arranged in the airflow chamber; and
    a second fan arranged in the first compartment.

7. The computer as described in claim 6, wherein the airflow chamber is arranged between the first and second compartment.

8. The computer as described in claim 6, wherein the first exchanger comprises a plurality of fins extending in the first compartment.

9. The computer as described in claim 6, further comprising at least one heat pipe having a first end thermally coupled to the first heat generating device and an opposite second end thermally coupled to the first heat exchanger.

10. The computer as described in claim 6, wherein the first compartment has a mounting plate with the motherboard mounted thereon, and a wall extending from the mounting plate with the second fan mounted thereon.

* * * * *